(12) United States Patent
Castro et al.

(10) Patent No.: US 7,677,596 B2
(45) Date of Patent: Mar. 16, 2010

(54) SIDE AIRBAG INTENSIFIER POCKET

(75) Inventors: Tiago Castro, Farmington Hills, MI (US); Kristi Elliot-Rumberger, Farmington Hills, MI (US); Kazuya Hirata, Farmington Hills, MI (US); Robert Panek, Farmington Hills, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 104 days.

(21) Appl. No.: 11/514,870

(22) Filed: Sep. 1, 2006

(65) Prior Publication Data

US 2008/0054604 A1 Mar. 6, 2008

(51) Int. Cl.
B60R 21/207 (2006.01)
B60R 21/23 (2006.01)

(52) U.S. Cl. .............. 280/730.2; 280/728.2; 280/728.3; 280/743.2

(58) Field of Classification Search .............. 280/730.2, 280/728.2, 728.3, 729, 743.2
See application file for complete search history.

(56) References Cited

U.S. PATENT DOCUMENTS

| | | | | |
|---|---|---|---|---|
| 5,678,853 A | * | 10/1997 | Maly | 280/730.2 |
| 5,762,363 A | * | 6/1998 | Brown et al. | 280/730.2 |
| 5,860,673 A | * | 1/1999 | Hasegawa et al. | 280/730.2 |
| 5,967,546 A | * | 10/1999 | Homier et al. | 280/730.2 |
| 5,975,567 A | * | 11/1999 | Higashiura | 280/730.2 |
| 5,988,674 A | * | 11/1999 | Kimura et al. | 280/730.2 |
| 6,074,003 A | * | 6/2000 | Umezawa et al. | 297/216.1 |
| 6,095,602 A | * | 8/2000 | Umezawa et al. | 297/216.1 |
| 6,126,192 A | * | 10/2000 | Enders | 280/728.2 |
| 6,364,347 B1 | * | 4/2002 | Holdampf et al. | 280/730.2 |
| 6,382,665 B2 | * | 5/2002 | Holdampf et al. | 280/730.2 |
| 6,578,911 B2 | * | 6/2003 | Harada et al. | 297/216.13 |
| 6,588,838 B1 | * | 7/2003 | Dick et al. | 297/216.13 |
| 6,783,151 B2 | * | 8/2004 | Rasch et al. | 280/729 |
| 7,134,685 B2 | * | 11/2006 | Panagos et al. | 280/730.2 |
| 7,232,150 B2 | * | 6/2007 | Nagayama | 280/730.2 |
| 2005/0156412 A1 | * | 7/2005 | Panagos et al. | 280/730.2 |
| 2006/0113772 A1 | * | 6/2006 | Tracht | 280/730.2 |
| 2006/0131848 A1 | * | 6/2006 | Miyake et al. | 280/730.2 |

* cited by examiner

Primary Examiner—Paul N. Dickson
Assistant Examiner—George D. Spisich
(74) Attorney, Agent, or Firm—Young Basile

(57) ABSTRACT

An apparatus for assisting and guiding deployment of a side airbag through a deployment seam of a seat cover for a vehicle seat having a seat frame includes an airbag assembly connectable to a support portion of the seat back frame, an intensifier pocket having an inboard and outboard panel, and an elongate support rod releasably connectable to the seat back frame of the vehicle seat for closing and anchoring an opening in the pocket. Each panel has a first peripheral portion connected to opposite edges of the deployment seam in the seat cover to be forced open during inflation of the side airbag, second peripheral portions extending inwardly toward the seat back frame where the inboard and outboard panels are connected to one another, and third peripheral portions defining an opening in the pocket of sufficient size to allow the pocket to be positioned over the airbag assembly and support portion of the seat back frame. The support rod can be engaged through at least one sleeve formed along the third peripheral portion of each panel for closing and anchoring the opening in the pocket.

14 Claims, 6 Drawing Sheets

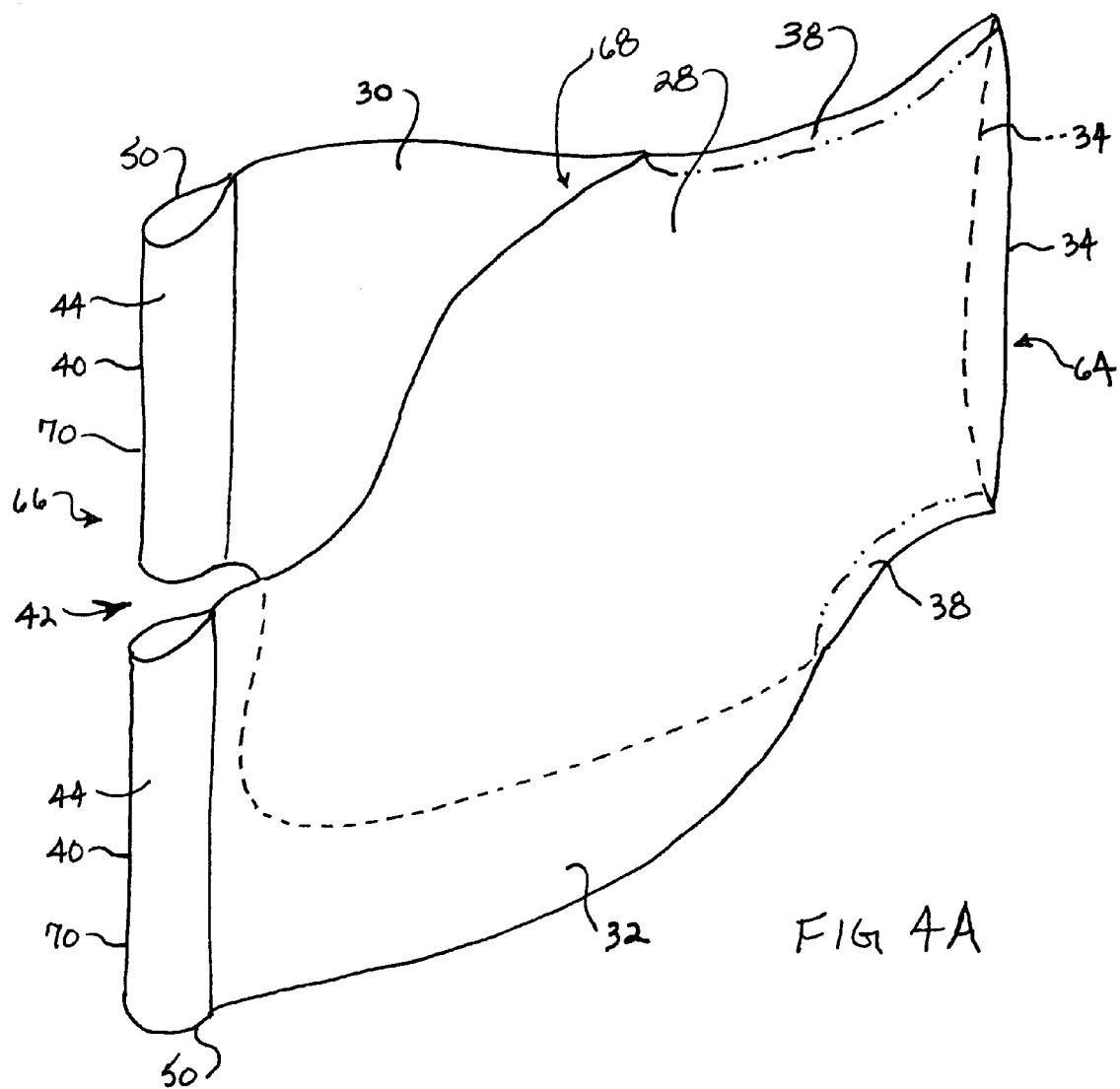

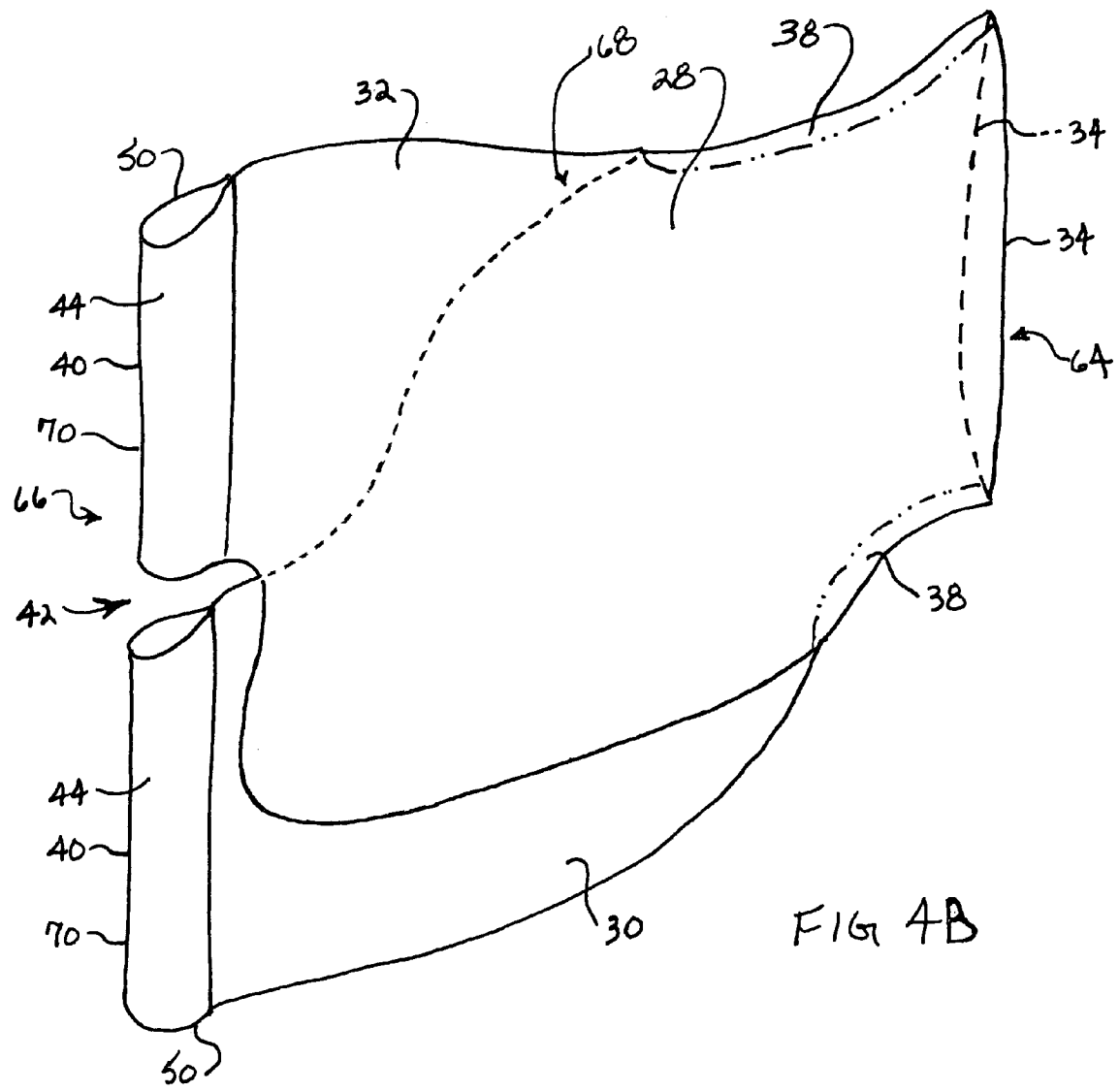

SIDE AIRBAG INTENSIFIER POCKET

FIELD OF THE INVENTION

The present invention relates to a vehicle seat side airbag assembly, and more particularly to a side airbag intensifier pocket for guiding a deploying airbag through a seam of a seat cover during inflation of the airbag by an inflator.

BACKGROUND

Various configurations of vehicle seat side airbag assemblies are generally known. For example, see U.S. Pat. No. 5,863,063; U.S. Pat. No. 5,927,749; U.S. Pat. No. 5,967,546; U.S. Pat. No. 6,007,091; and U.S. Pat. No. 6,045,151. While these devices appear to be suitable for their intended use, the configurations disclosed can be difficult to assemble, and/or difficult to install, and/or difficult to service after initial installation. It would be desirable to provide a side airbag assembly that is easier to assemble, and/or easier to install, and/or easier to service after initial installation.

SUMMARY

An apparatus for assisting and guiding deployment of a side airbag through a deployment seam of a seat cover for a vehicle seat having a seat back frame can include an airbag assembly connectable to a support portion of a seat back frame and including a side airbag and an inflator. The side airbag can be operably connected to the inflator for inflation through a deployment seam in a seat cover to be installed on the vehicle seat to at least partially enclose the seat back frame. An intensifier pocket can have an inboard panel and an outboard panel. Each panel can have a first peripheral portion connecting the deployment seam in the seat cover to be forced open during inflation of the side airbag. Each panel can have at least one second peripheral portion extending inwardly toward the seat back frame within the vehicle seat from the deployment seam. The inboard and outboard panels can be connected to one another along the second peripheral portion. Each panel can have a third peripheral portion spaced from the first peripheral portion by the second peripheral portion. The third peripheral portion can define an opening in the pocket of sufficient size to allow the pocket to be positioned over the airbag assembly and support portion of the seat back frame. Each panel can have at least one sleeve formed along the third peripheral portion. An elongate support rod can releasably be connected to the seat back frame of the vehicle seat. The support rod can be engaged through the sleeve formed along the third peripheral portion of each panel for closing and anchoring the opening in the pocket along the third peripheral portion of each panel.

A method for assembling a side airbag to a seat frame in a vehicle seat for inflation through a deployment seam of a seat cover can include connecting an airbag assembly to a support portion of a seat back frame. The airbag assembly can include a side airbag and inflator. The side airbag can be operably connected to the inflator for inflation through a deployment seam in a seat cover to be installed on the vehicle seat to at least partially enclose the seat back frame. The method can include installing the seat cover over the seat back frame and connected airbag assembly, and positioning an intensifier pocket over the airbag assembly and support portion of the seat back frame. The intensifier pocket can have an inboard panel and an outboard panel. Each panel can have a first peripheral portion connecting edges of the deployment seam in the seat cover to be forced open during inflation of the side airbag. Each panel can have at least one second peripheral portion extending inwardly toward the seat back frame within the vehicle seat from the deployment seam. The inboard and outboard panels can be connected to one another along the second peripheral portion. Each panel can have a third peripheral portion spaced from the first peripheral portion by the second peripheral portion. The third peripheral portion can define an opening in the pocket of sufficient size to allow the pocket to be positioned over the airbag assembly and support portion of the seat back frame. Each panel can have at least one sleeve formed along the third peripheral portion. The method can include releasably connecting an elongate support rod to the seat back frame of the vehicle seat, after engaging the support rod through the at least one sleeve formed along the third peripheral portion of each panel for closing and anchoring the opening in the pocket along the third peripheral portion of each panel.

The invention can include a method of assembling an airbag in a vehicle seat including connecting an airbag assembly to a support portion of a seat back frame of a vehicle seat, attaching an outer end of an intensifier pocket to opposite sides of a deployment seam in a seat cover, installing the seat cover over the seat back frame, and after installing the seat cover on the seat back frame, releasably connecting an elongate support rod to the seat back frame, after engaging the support rod with an inner open end of the intensifier pocket for closing and anchoring the inner open end of the intensifier pocket with the airbag assembly and support portion of the seat back frame located within an interior of the intensifier pocket.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIGS. 4A and 4B are simplified schematic perspective views of an intensifier pocket;

DETAILED DESCRIPTION

Figure 1:
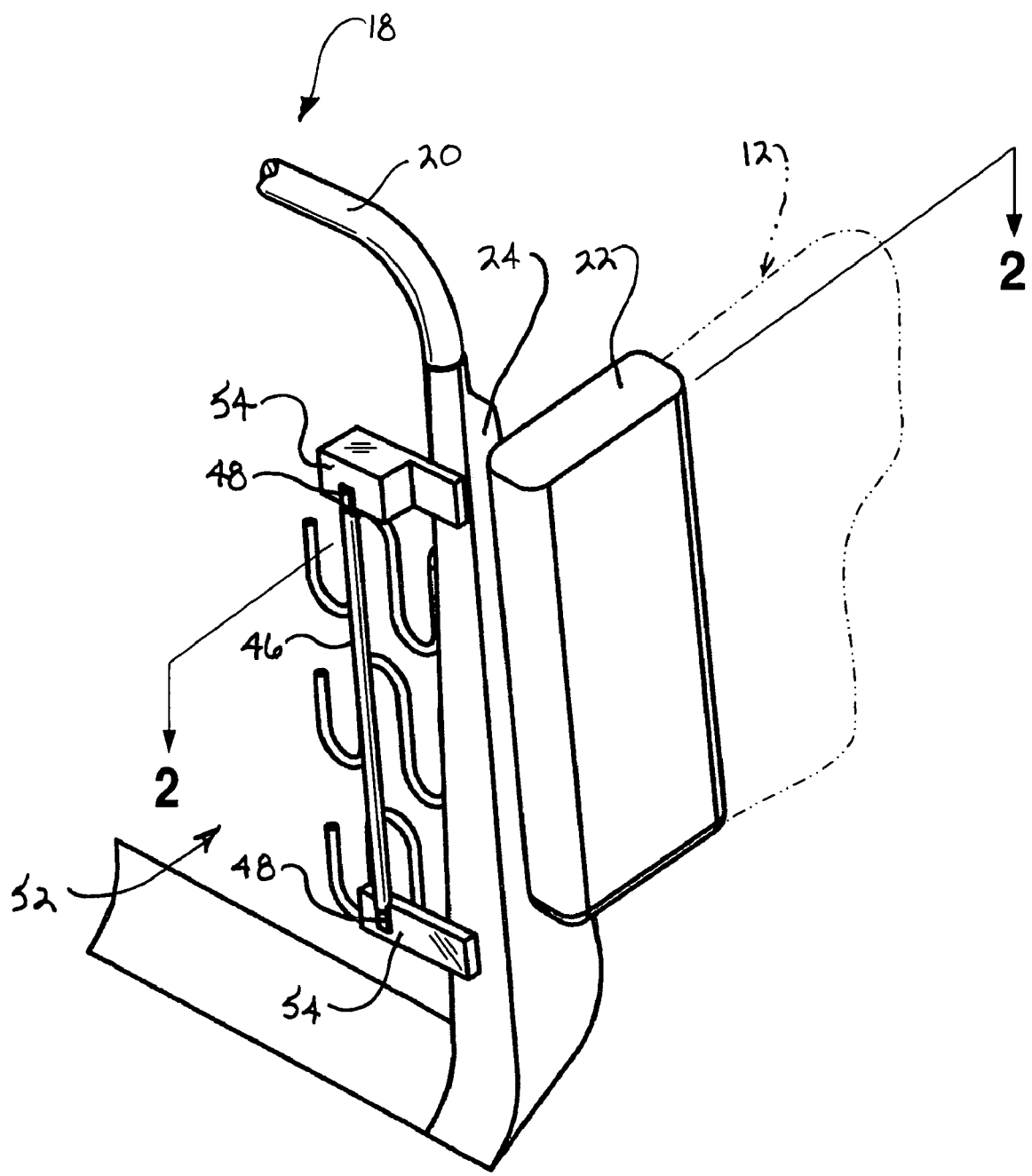
FIG. 1 is a simplified schematic view of a portion of a seat back frame for a vehicle seat having an airbag assembly connected to a support portion of the seat back frame.
Figure 2:
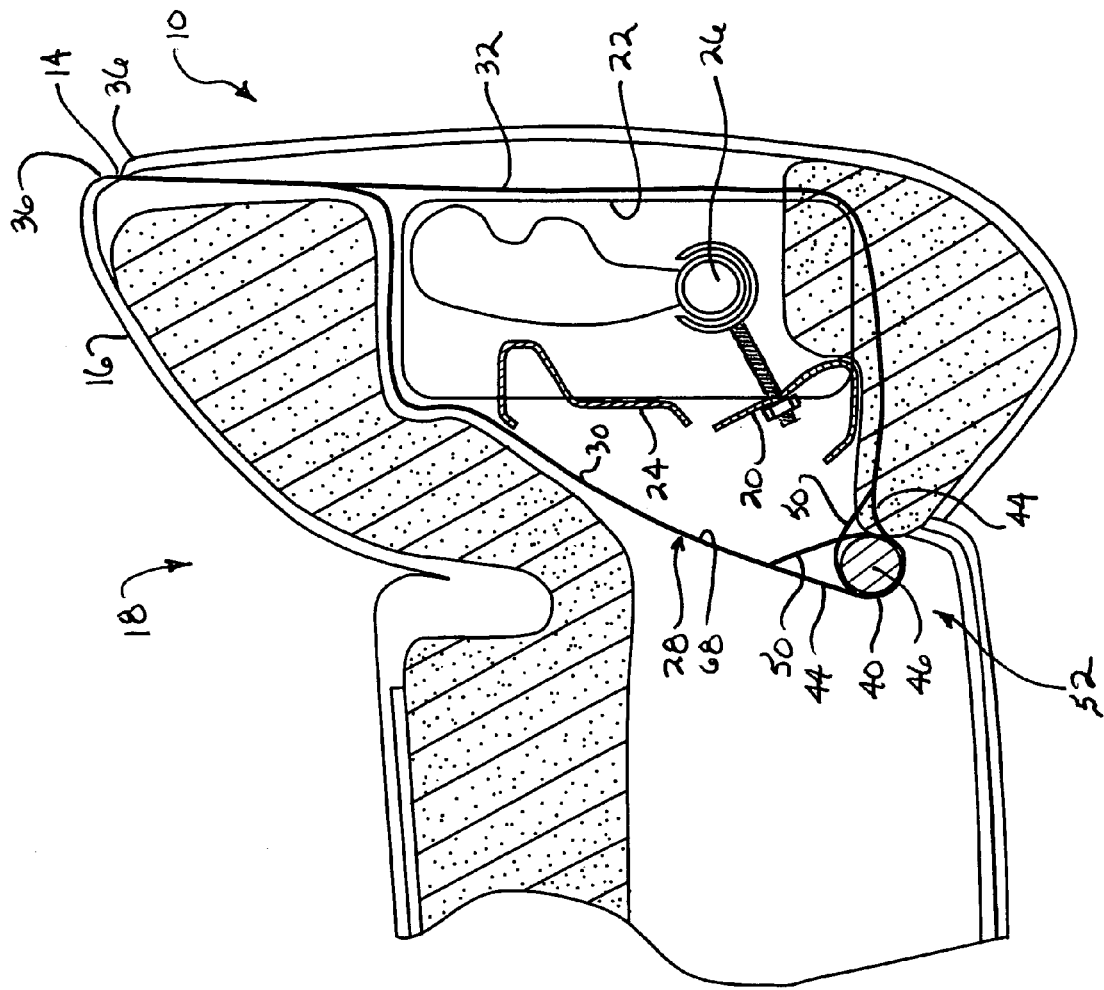
FIG. 2 is a cross-sectional view of a vehicle seat taken as shown in FIG. 1.
Figure 3:
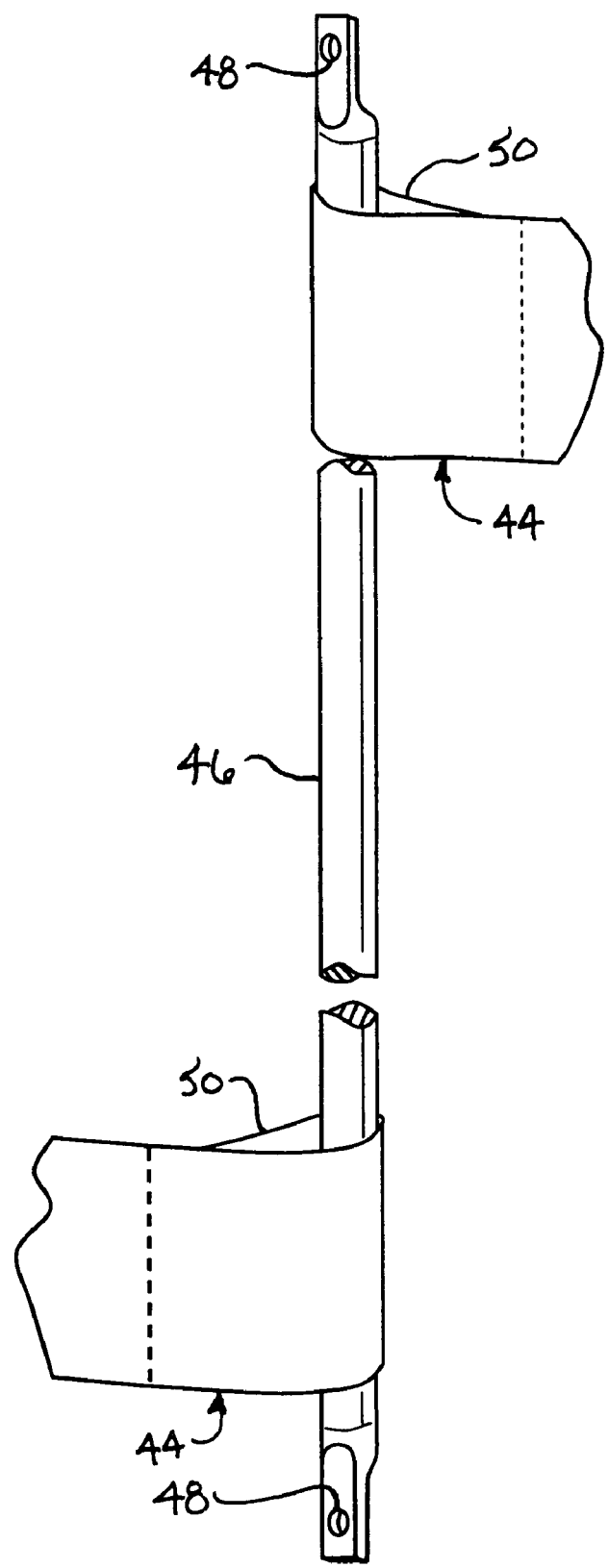
FIG. 3 is a detailed view of an inner end of each panel of the intensifier pocket illustrating at least one sleeve formed along the third peripheral portion with longitudinally faced portions of the elongate support rod sheathingly engaged with coaxially aligned single loops of material formed along the third peripheral portion of each panel.

Referring now to FIGS. 1-4B, an apparatus 10 for assisting and guiding deployment of a side airbag 12 through a deployment seam 14 of a seat cover 16 for a vehicle seat 18 having a seat back frame 20 can include an airbag assembly 22 connectable to a support portion 24 of the seat back frame 20. The airbag assembly 22 can include a side airbag 12 and an inflator 26. The inflator 26 is connected to a lateral side portion (nearest to the vehicle door) of the seat back frame 20 by a threaded fastener that extends through the lateral side portion and a nut threadably engaged with the threaded fastener. The side airbag 12 can be operably connected to the inflator 26 for inflation through the deployment seam 14 in the seat cover 16 to be installed over the vehicle seat 18 to at least partially enclose the seat back frame 20. An intensifier pocket 28 can include an inboard panel 30 and an outboard panel 32. The panels 30, and 32 are preferably formed of a flexible sheet material having a high tensile strength such as woven nylon fabric. Each panel 30, 32 can have a first peripheral portion 34 connected to opposite edges 36 of the deployment seam 14 in the seat cover 16 to be forced open during inflation of the side airbag 12. Each panel 30, 32 can have at least one second peripheral portion 38 extending inwardly toward the seat back frame 20 within the vehicle seat 18 from the deployment seam 14. The inboard and outboard panels 30, 32 can be connected to one another along the second peripheral portion 38. The inboard and outboard are preferably connected to each other by sewing using a repeating stitching pattern. Each panel 30, 32 can have a third peripheral portion 40 spaced from the first peripheral portion 34 by the second peripheral portion 38. The third peripheral portion 40 can define an opening 42 in the pocket 28 of sufficient size to allow the pocket 28 to be positioned over the airbag assembly 22 and support portion 24 of the seat back frame 20. Each panel 30, 32 can have at least one sleeve 44 formed along the third peripheral portion 40. The sleeve 44 is preferably formed by sewing using a repeating stitching pattern. An elongate support rod 46 can be releasably connectable at opposite ends 48 to the seat back frame 20 of the vehicle seat 18. The support rod 46 can be engageable through the at least one sleeve 44 formed along the third peripheral portion 40 of each panel 30, 32 for closing and anchoring the opening 42 in the pocket 28 along the third peripheral portion 40 of each panel 30, 32.

The at least one sleeve 44 of each panel 30, 32 of the intensifier pocket 28 can be defined by a single loop 50 of material formed along the third peripheral portion 40 of each panel 30, 32 for sheathingly engaging longitudinally spaced portions of the support rod 46. The support rod 46 can extend through coaxially aligned single loops 50 of material formed along the third peripheral portion 40 of each panel 30, 32. FIG. 4A shows an orientation of the inboard and outboard panels 30 and 32 according to a first embodiment of the invention. The sleeve 44 of the outboard panel 32, is located below the sleeve 44 of the inboard panel 30 when positioned along the elongate support rod. FIG. 4B shows an orientation of the inboard and outboard panels 30 and 32 according to a second embodiment of the invention. The sleeve 44 of the inboard panel 30, is located below the sleeve 44 of the outboard panel 32 when positioned along the elongate support rod. The support rod 46 can be connectable to the seat back frame 20 separate from the airbag assembly 22 through an open rear portion 52 of the seat cover 16. The support rod 46 can be bolted to the seat back frame 20 of the vehicle seat 18 at spaced positions 54 located separate from the support portion 24 of the seat back frame 20 connecting the airbag assembly 22.

Figure 5:
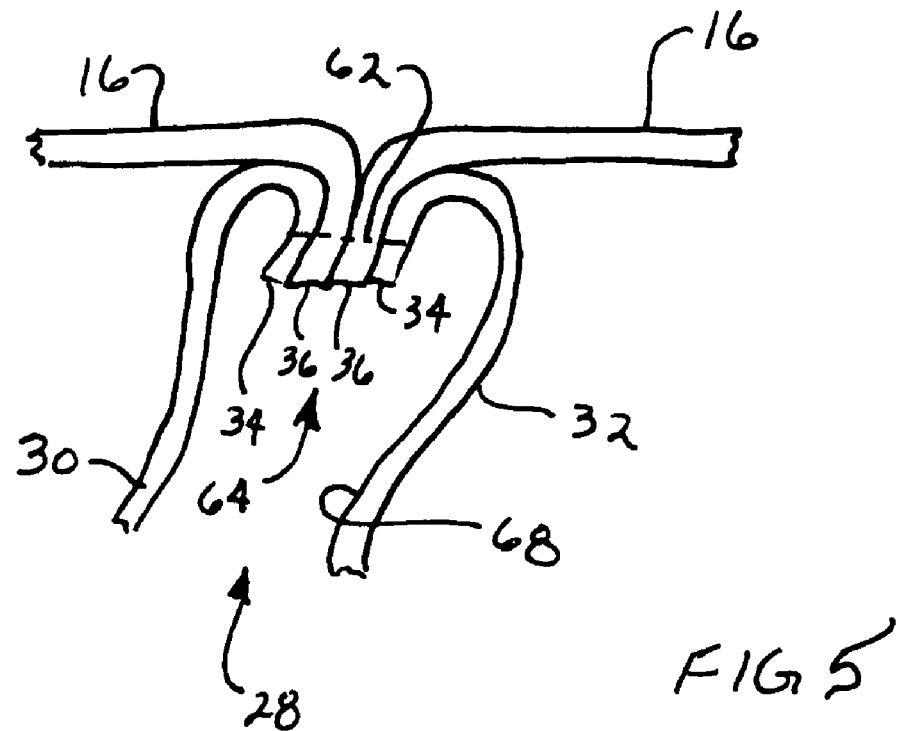
FIG. 5 is a simplified cross sectional detail view of a deployment seam with a single sewn thread closure.
Figure 6:
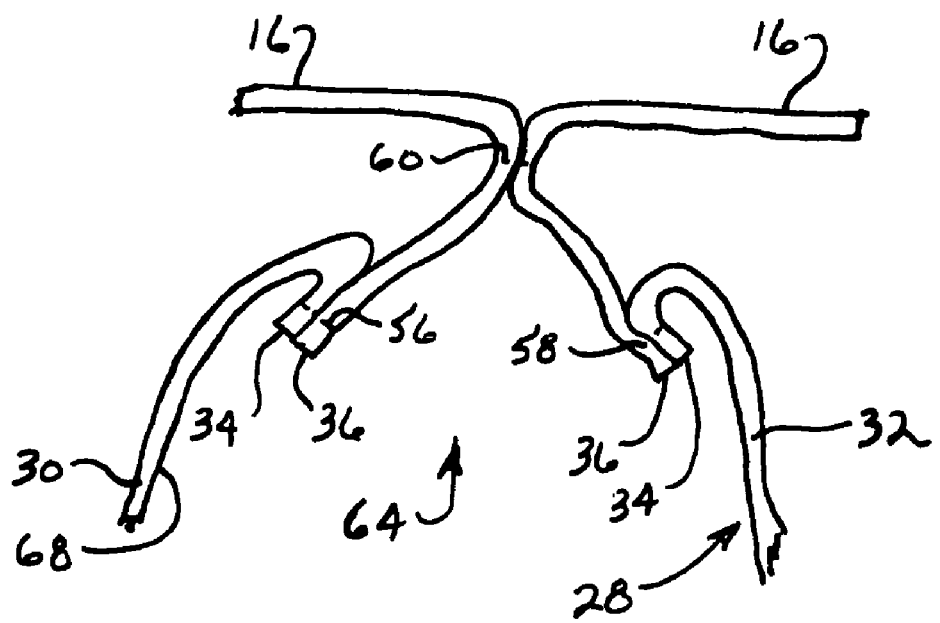
FIG. 6 is a simplified cross sectional detail view of a deployment seam with a multiple sewn thread closure.

Referring now to FIG. 5, the deployment seam 14 in the seat cover 16 and the first peripheral portions 34 of the inboard and outboard panels 30, 32 of the intensifier pocket 28 can be sewn together with a single common thread 62. Referring now to FIG. 6, the deployment seam 14 in the seat cover 16 can be sewn together with two separate threads 56, 58 connecting the inboard and outboard panels 30, 32 to separate edges 36 of the deployment seam 14 of the seat cover 16, and a third thread 60 can connect the opposite edges 36 of the deployment seam 14 of the seat cover 16 to one another. In any of the embodiments, seat cover 16 may include a reinforcement layer disposed on an inner surface thereof to aid in the deployment of the airbag from the seat. The reinforcement layer may be formed of nylon sheeting and attached to the inner surface of the seat cover by adhesive, heat bonding, or along a periphery of the seat cover 16 by stitching. The seat cover preferably includes the reinforcement layer along the lateral portion of the seat nearest to the outboard panel 32. However, it can be appreciated that other portions of the seat cover 16 may include the reinforcement layer.

A process for assembling a side airbag 12 to a seat back frame 20 in a vehicle seat 18 for inflation through a deployment seam 14 of a seat cover 16 according to an embodiment of the present invention can include connecting an airbag assembly 22 to a support portion 24 of a seat back frame 20. The airbag assembly 22 can include a side airbag 12 and an inflator 26. The side airbag 12 can be operably connected to the inflator 26 for inflation through a deployment seam 14 in a seat cover 16 to be installed on the vehicle seat 18 to at least partially enclose the seat back frame 20. The process continues by installing the seat cover 16 over the seat back frame 20 and connected airbag assembly 22. An intensifier pocket 28 can then be positioned over the airbag assembly 22 and support portion 24 of the seat back frame 20. The intensifier pocket 28 can have an inboard panel 30 and an outboard panel 32. Each panel 30, 32 can have a first peripheral portion 34 connected to opposite edges 36 of the deployment seam 14 in the seat cover 16 to be forced open during inflation of the side airbag 12. Each panel 30, 32 can have at least one second peripheral portion 38 extending inwardly toward the seat back frame 20 within the vehicle seat 18 from the deployment seam 14. The inboard and outboard panels 30, 32 can be connected to one another along the second peripheral portion 38. Each panel 30, 32 can have a third peripheral portion 40 spaced from the first peripheral portion 34 by the second peripheral portion 38. The third peripheral portion 40 can define an opening 42 in the intensifier pocket 28 of sufficient size to allow the pocket 28 to be positioned over the airbag assembly 22 and support portion 24 of the seat back frame 20. Each panel 30, 32 can have at least one sleeve 44 formed along the third peripheral portion 40. The process can continue by releasably connecting opposite ends 48 of an elongate support rod 46 to the seat back frame 20 of the vehicle seat 18, after engaging the support rod 46 through the at least one sleeve 44 formed along the third peripheral portion 40 of each panel 30, 32 for closing and anchoring the opening 42 in the pocket 28 along the third peripheral portion 40 of each panel 30, 32.

The process can include sheathingly engaging longitudinally spaced portions of the support rod 46 with the at least one sleeve 44 defined by a single loop 50 of material formed along the third peripheral portion 40 of each panel 30, 32 of the intensifier pocket 28. The support rod 46 can extend through coaxially aligned single loops 50 of material formed along the third peripheral portion 40 of each panel 30, 32. The process can provide for accessing the support portion 24 of the seat back frame 20 through an open rear portion 52 of the seat cover 16 for connecting the support rod 46 to the seat back frame 20 separate from the airbag assembly 22 that was installed prior to installing the seat cover 16. The process can provide for bolting the support rod 46 to the seat back frame 20 of the vehicle seat 18 at spaced positions 54 separate from the support portion 24 of the seat back frame 20 connecting the airbag assembly 22.

The process can include sewing the deployment seam 14 in the seat cover 16 together with two separate threads 56, 58 connecting the inboard and outboard panels 30, 32 to separate edges 36 of the deployment seam 14 of the seat cover 16, and sewing another thread 60 connecting the opposite edges 36 of the deployment seam 14 to one another. Alternatively, the process can provide for sewing the deployment seam 14 in the seat cover 16 and the first peripheral portions 34 of the inboard and outboard panels 30, 32 of the intensifier pocket 28 together with a single common thread 62.

A method of assembling an airbag 12 in a vehicle seat 18 according to an embodiment of the present invention can include connecting an airbag assembly 22 to a support portion 24 of a seat back frame 20 of a vehicle seat 18, attaching an outer end 64 of an intensifier pocket 28 to opposite side edges 36 of a deployment seam 14 in a seat cover 16, installing the seat cover 16 over the seat back frame 20, and after installing the seat back cover 16 on the seat back frame 20, releasably connecting opposite ends 48 of an elongate support rod 46 to the seat back frame 20, after engaging the support rod 46 with an inner open end 66 defining opening 42 of the intensifier pocket 28 with the airbag assembly 22 and support portion 24 of the seat back frame 20 located within an interior chamber 68 of the intensifier pocket 28.

The method of assembly can include sheathingly engaging longitudinally spaced portions of the support rod 46 with the at least one sleeve 44 defined by a single loop 50 of material formed along the inner open end 66 of the intensifier pocket 28. The support rod 46 can be assembled extending through coaxially aligned single loops 50 of material formed along opposite sides of an opening 42 defined by the inner open end 66 of the pocket 28. The method of assembly can provide for accessing the support portion 22 of the seat back frame 20 through an open rear portion 52 of the seat cover 16 for connecting the support rod 46 to the seat back frame 20 separate from the airbag assembly 22 that was installed prior to installing the seat cover 16. The method of assembly can provide for bolting the support rod 46 to the seat back frame 20 of the vehicle seat 18 at spaced positions 54 separate from the support portion 24 of the seat back frame 20 connecting the airbag assembly 22.

The method of assembly can include sewing the deployment seam 14 and the seat cover 16 together with two separate threads 56, 58 connecting the outer end 64 to separate opposite edges 36 of the deployment seam 14 of the seat cover 16, and another thread 60 connecting the opposite edges 36 of the deployment seam 14 to one another. Alternatively, the method of assembly can include sewing the deployment seam 14 in the seat cover 16 and connecting the outer end 64 of the intensifier pocket 28 together with a single common thread 62.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for assisting and guiding deployment of a side airbag through a deployment seam of a seat cover for a vehicle seat having a seat back frame comprising:

an airbag assembly connectable to a support portion of a seat back frame and including a side airbag and an inflator, the side airbag operably connected to the inflator for inflation through a deployment seam in a seat cover to be installed on the vehicle seat to at least partially enclose the seat back frame;

an intensifier pocket having an inboard panel and an outboard panel, the inboard panel extending between an interior surface of padding for the vehicle seat and the airbag assembly, each panel having a first peripheral portion connected to opposite edges of the deployment seam in the seat cover to be forced open during inflation of the side airbag, each panel having at least one second peripheral portion extending inwardly toward the seat back frame within the vehicle seat from the deployment seam, the inboard and outboard panels connected to one another along the second peripheral portion, and each panel having a third peripheral portion spaced from the first peripheral portion by the second peripheral portion, the third peripheral portion defining an opening in the pocket of sufficient size to allow the pocket to be positioned over the airbag assembly and support portion of the seat back frame, each panel having at least one sleeve formed along the third peripheral portion, wherein the sleeve of each panel is formed continuously along the entire length of the third peripheral portion of each panel; and a single elongate support rod having a first end releasably connected to the seat back frame of the vehicle seat at a first location and a second end releasably connected to the seat back frame of the vehicle seat at a second location spaced vertically above or below the first location, the support rod disposed through the at least one sleeve formed along the third peripheral portion of each panel for closing and anchoring the opening in the pocket along the third peripheral portion of each panel.

2. The apparatus of claim 1, wherein the at least one sleeve is defined by a single loop of material formed along the third peripheral portion of each panel for sheathingly engaging longitudinally spaced portions of the support rod.

3. The apparatus of claim 2, wherein the support rod extends through coaxially aligned single loops of material formed along the third peripheral portion of each panel.

4. The apparatus of claim 1, wherein the support rod is connectable to the seat back frame separate from the airbag assembly through an open rear portion of the seat cover.

5. The apparatus of claim 1, wherein the support rod is bolted to the seat back frame of the vehicle seat at spaced positions located separate from the support portion of the seat back frame connecting the airbag assembly.

6. The apparatus of claim 1, wherein the deployment seam in the seat cover and the first peripheral portions of the inboard and outboard panels of the intensifier pocket are sewn together with a single common thread.

7. The apparatus of claim 1, wherein the support rod is substantially straight.

8. A method of assembling an airbag in a vehicle seat comprising:

connecting an airbag assembly to a support portion of a seat back frame of a vehicle seat;

attaching an outer end of an intensifier pocket to opposite sides of a deployment seam in a seat cover;

installing the seat cover over the seat back frame;

routing the intensifier pocket between an inner surface of padding for the vehicle seat and the airbag assembly; and bolting a first end of a substantially straight single elongate support rod to the seat back frame at a first location after installing the seat cover on the seat back frame; and bolting a second end of the support rod to the seat back frame at a second location spaced vertically above or below the first location, after engaging the support rod with an inner open end of the intensifier pocket for closing and anchoring the inner open end of the intensifier pocket with the airbag assembly and support portion of the seat back frame located within an interior of the intensifier pocket, wherein the first location and the second location are separate from the support portion of the seat back frame connecting the airbag assembly.

9. The method of claim 8 further comprising:

sheathingly engaging longitudinally spaced portions of the support rod with a single loop of material formed along the inner open end of the intensifier pocket.

10. The method of claim 9, wherein the sheathingly engaging step further comprises:

extending the support rod through coaxially aligned single loops of material formed along opposite sides of an opening defined by the inner open end of the pocket.

11. The method of claim 8, wherein the releasably connecting step further comprises:

accessing the support portion of the seat back frame through an open rear portion of the seat cover for connecting the support rod to the seat back frame separate from the airbag assembly installed prior to installing the seat cover.

12. The method of claim 8 further comprising:

sewing the deployment seam in the seat cover and the opposite portions of the outer end of the intensifier pocket together with a single common thread.

13. An apparatus for assisting and guiding deployment of a side airbag through a deployment seam of a seat cover for a vehicle seat having a seat back frame comprising:

an airbag assembly connectable to a support portion of a seat back frame and including a side airbag and an inflator, the side airbag operably connected to the inflator for inflation through a deployment seam in a seat cover to be installed on the vehicle seat to at least partially enclose the seat back frame;

an intensifier pocket having an inboard panel and an outboard panel, the inboard panel extending between an interior surface of padding for the vehicle seat and the airbag assembly, each panel having a first peripheral portion connected to opposite edges of the deployment seam in the seat cover to be forced open during inflation of the side airbag, each panel having at least one second peripheral portion extending inwardly toward the seat back frame within the vehicle seat from the deployment seam, the inboard and outboard panels connected to one another along the second peripheral portion, and each panel having a third peripheral portion spaced from the first peripheral portion by the second peripheral portion, the third peripheral portion defining an opening in the pocket of sufficient size to allow the pocket to be positioned over the airbag assembly and support portion of the seat back frame, each panel having at least one sleeve formed along the third peripheral portion; and a single elongate support rod having a first end releasably connected to the seat back frame of the vehicle seat at a first location and a second end releasably connected to the seat back frame of the vehicle seat at a second location spaced vertically above or below the first location, the support rod disposed through the at least one sleeve formed along the third peripheral portion of each panel for closing and anchoring the opening in the pocket along the third peripheral portion of each panel, wherein the support rod is substantially straight, and further wherein the first end of the support rod is bolted to the seat back frame of the vehicle at the first location, and the second end of the support rod is bolted to the seat back frame at the second location.

14. The apparatus of claim 13, wherein the sleeve of each panel is formed continuously along the entire length of the third peripheral portion of each panel.

* * * * *